Figures 1, 2:
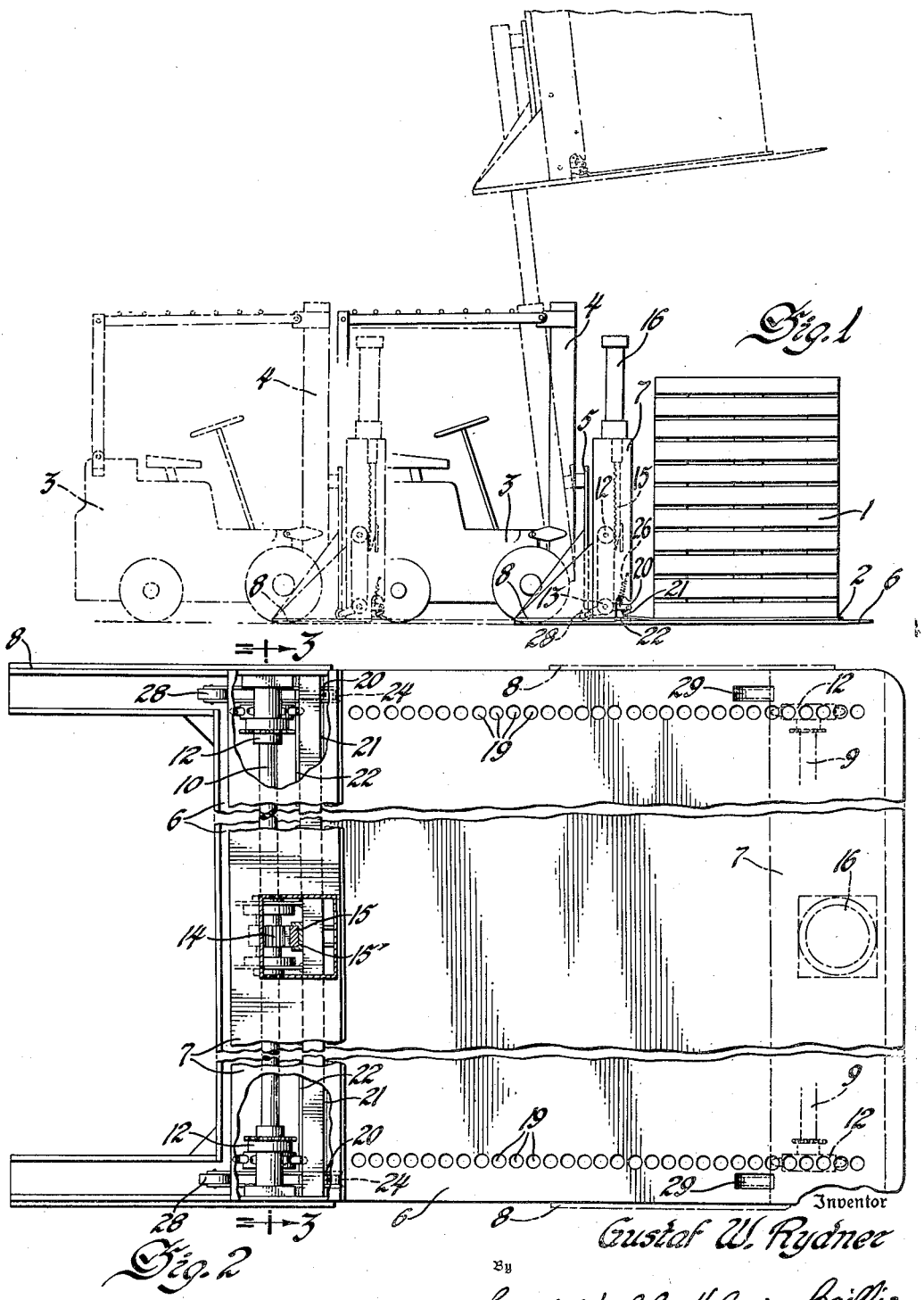

Nov. 27, 1951      G. W. RYDNER      2,576,482
SHEET PALLET STACKER

Filed Oct. 15, 1947      2 SHEETS—SHEET 1

Inventor
Gustof W. Rydner
By
Spencer, Willits, Helmig & Baillie
Attorneys

Nov. 27, 1951  G. W. RYDNER  2,576,482
SHEET PALLET STACKER
Filed Oct. 15, 1947  2 SHEETS—SHEET 2

Inventor
Gustaf W. Rydner
By
Spencer, Willits, Helmig & Baillio
Attorneys

Patented Nov. 27, 1951

2,576,482

UNITED STATES PATENT OFFICE 2,576,482

SHEET PALLET STACKER

Gustaf W. Rydner, Detroit, Mich., assignor to General Motors Corporation, Detroit, Mich., a corporation of Delaware Application October 15, 1947, Serial No. 779,901

13 Claims. (Cl. 214—65)

This invention relates to material handling equipment and deals with factory and warehouse practices of placing bulk articles and packages on a pallet and handling them as a unit with the pallet in their storage and their conveyance on the skid plate of a conventional industrial lift truck. The present subject matter is concerned especially with the loading and unloading of the skid or lift plate and the use of a pallet in the form of a thin sheet. The sheet pallet of a surface area substantially corresponding to that of the lift plate may be of wood, sheet metal, fabric or other material. A piece of canvas affords a serviceable pallet. Heavy paper or strawboard, commonly used for making shipping cartons, has been found to afford inexpensive pallets, particularly if they are salvaged from used wrappings from incoming freight. An object of the invention is to provide a skid plate loader assembly for detachable mounting on the hoist of the usual factory lift truck and which assembly consists of a load carrying platform having thereon a power actuated pusher-shover to travel to and fro relative to the platform in the loading and unloading operations and which pusher-shover device has associated with it a pair of clamping jaws to grip and hold the edge of the sheet pallet as the lift plate is skidded under a loaded pallet.

A further object of the invention is to provide a push-pull loader which can be built sturdily from readily available and relatively inexpensive parts, including a flat steel load carrying plate and a frame to slide back and forth on the plate and to be projected and retracted by a power cylinder arranged to drive a plate engaging traction wheel, preferably in the form of a cog wheel, which walks along a plate carried rack located wholly below the top surface of the plate so as not to interfere or obstruct positioning of the pallet thereon. With the same thought of avoiding projections above the flat loading surface the plate is provided with a depression near its leading edge into which drops a plate follower for opening the clamping jaws when the frame reaches its forward limit of travel. In all other positions of assembly travel the follower tracks or rides on the upper plate surface and thereby maintains the clamping jaws in closed or edge holding relation.

With the improved construction referred to the loaded sheet pallet is dragged on the transporting truck by first lowering the lift plate to the floor and preferably to an initially forwardly tilted angle so that its leading tapered edge can be moved under an exposed edge portion of the pallet and which pallet edge portion slips between the open clamping jaws of the forwardly positioned loader frame. Thereupon the truck operator, by proper manipulation of controls, starts retraction of the loader frame backwardly which causes the clamping jaws to grip the pallet and concurrently drives the truck forward to skid the plate under the loaded pallet which is held by and drawn on the plate by continued retraction of the loader and the simultaneous forward travel of the skid plate under the sheet pallet. When retraction of the loader is complete the lift platform may be raised to any convenient height for conveying the load to a different location where it is to be deposited on the floor or stacked at any elevation within the range of the hoist. Unloading is accomplished by projecting the slidable frame assembly to shove or push the load forward and at the same time withdrawing the plate from under the loaded pallet. The clamping jaws automatically release the pallet edge when the forward frame limit is reached.

Figure 3:
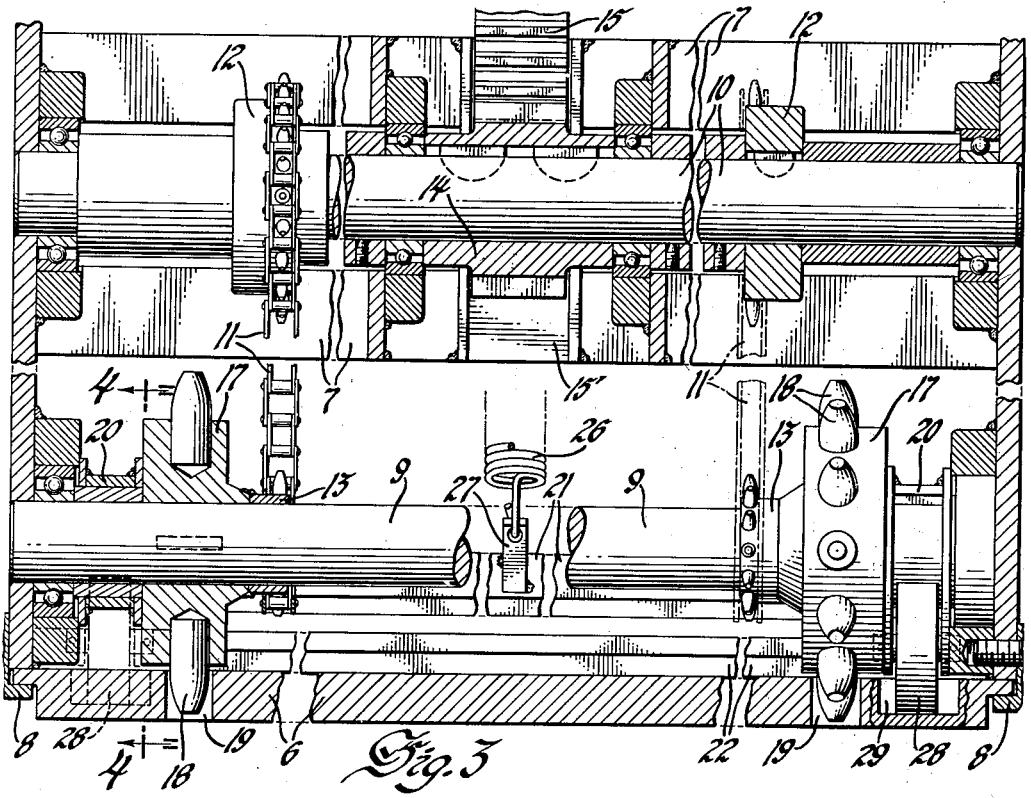
Figure 4:
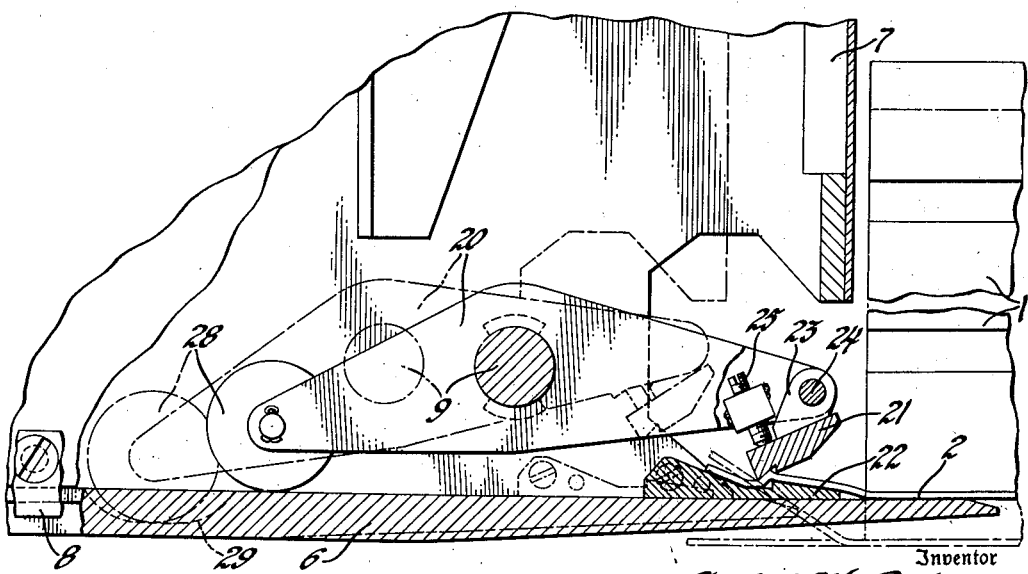

Referring to the accompanying drawings, Figure 1 is a side elevation showing several realtive positions of the truck, its loader assembly and the pallet load; Figure 2 is a top plan view of the loader assembly unit with parts broken away; Figure 3 is a transverse section generally on line 3—3 of Figure 2 and on a larger scale and Figure 4 is a fragmentary section as on line 4—4 of Figure 3.

In Figure 1 a stack 1 of articles to be handled is positioned on a sheet pallet 2 resting upon the loader assembly forming a part of the factory lift truck 3. The full line position of the truck shows the relation of parts immediately following the loading operation, and which relation is also that which immediately precedes the unloading operation. By dotted lines the load is shown hoisted as for elevated stacking. A further dotted line truck position forms a part of Figure 1 to indicate the approach or departure of the skid plate to a pallet resting on the floor. The ordinary hoist truck includes an extensible tower structure 4 pivotally mounted at the front of the truck and including a vertical lift plate 5 and it is to the lift plate that the present loader structure is detachably hooked. The suspension structure carries the forwardly projecting skid plate 6 on which is slidable to and fro the push-pull frame 7. The side plates of the frame ride along the opposite edges of the skid plate 6 and have bolted thereto a pair of retainer members 8—8 which engage under projecting and guiding flanges at each side of the plate 6, as best seen in Figure 3.

Mounted in suitable bearings in the side plates of the frame 7 are a pair of vertically spaced transverse shafts 9 and 10 having motion transmitting connection therebetween in the form of a pair of drive chains 11—11 engaging sprocket wheels 12 keyed to the shaft 10 and sprocket wheels 13 keyed or fixed to the shaft 9. Keyed to and centrally positioned on the upper shaft 10 is a gear 14 in mesh with the vertical shiftable rack 15 slidable in a channel guide 15' welded to and forming a part of the frame 7. At its upper end the rack 15 is joined to the piston of a conventional power cylinder 16 which can be projected or retracted upon the application of fluid under pressure to one or the other of the ends of the cylinder under control of suitable valving within convenient reach of the truck operator. Movement of the rack 15 is transmitted through the gears and sprocket chain to rotate the lower shaft 9 in one direction or the other for actuating a pair of spaced traction wheels 17 having spaced lugs or cogs 18 which engage with openings 19 drilled in a row through the load supporting plate 6. These openings, arranged in spaced longitudinal succession, afford a rack by means of which the loader frame is caused to walk or travel along the plate upon actuation of the power cylinder 16. It will be noted that the formation of the rack in this fashion preserves the flat loading surface on top of the lift plate and enables the use of pallets of any convenient size and even pallets whose width exceeds the transverse spacing between the racks and whether or not the pallets overhang the side edges of the lift plate.

The lower shaft 9 serves also as a bearing fulcrum or support for a pair of transversely spaced rock levers 20 having arms projecting fore and aft. Each forwardly projecting arm is joined to a clamping bar 21 which extends transversely across the front of the traveling frame for cooperation with a mating clamping plate or jaw 22, bolted or otherwise fixed to an adjoining portion of the movable frame 7. As seen in Figure 4, the clamping jaws have cooperating tooth portions for insuring a firm grip or bite on the edge portion of the strip pallet 2. For relative adjustment of the clamping jaws and rocker arms to compensate for variations in pallet thickness the gripper jaw 21 has upwardly extending ears 23 held by pivot bolts 24 on the rocker arm and an adjustable set screw or stop 25 carried by the arm engages with the free end of the clamping jaw 21 for setting its position on the rocker arm in relation to the fixed jaw 22. It is held upwardly against the stop by one or more coil springs 26 anchored at the top in any convenient manner to the frame 7 and joined at the bottom to the jaw 21 as by means of an attachment ear 27 shown in Figure 3 as extending upwardly from the jaw 21. A constant upward spring pull exerted at the forward end of the lever 20 tends always to rock the lever toward jaw opening position so that the opposite end of the lever is urged downwardly against the lift plate. Accordingly the rearwardly projecting rocker arm is provided with a follower or roller 28 and when this roller rides or tracks over the upper face of the plate it maintains the clamping jaws closed. Automatic opening of the jaws is provided for when the traveling frame reaches its forward limit by means of suitably located depressions 29 in the upper face of the plate and into which the roller drops. Here again the roller receiving depression or recess insures the absence of projections above the top surface of the load carrying plate. The open position of the jaws is shown by broken lines in Figure 4 with the leading edge of the lift plate in position of approach and just prior to the reception of the pallet edge between the clamping jaws. After a further slight forward movement of the lift plate the retraction of the traveling frame is started which moves the roller 28 out of the depression for closing the clamping jaws to grip the pallet edge portion and as the skid plate continues to move forward relative to both the frame 7 and the load it pushes itself under the load, whose sheet pallet is anchored in relation to the power actuated frame 7. Usually the load when picked up will be spaced a short distance from the vertically disposed flat forward face of the frame 7, somewhat as seen in Figure 4, and this space will be taken up upon projection of the frame to unload the skid inasmuch as the front face of the frame 7 pushes or shoves against the side of the load. The flexible edge portion of the pallet in the region between the load and the part gripped by the clamping jaws will buckle to accommodate and take up the space and as soon as the forward limit of frame travel is reached the roller 28 dropping in the depression 29 will allow the jaws to open and release the pallet for the withdrawal of the leading edge of the lift plate from beneath the pallet.

I claim:

1. For handling material loaded on a sheet pallet, a truck having a load carrying plate arranged to be skidded under a pallet in the operation of loading the plate, a self-contained power actuated loader unit movably mounted on the plate, a pallet edge gripper device forming a part of and movable with said loader unit, and operating mechanism therefor including a plate engaging follower movably mounted on said unit and operably connected with the gripper device and a follower track on the plate having a contour for causing follower actuation during unit travel relative to the plate to set the gripper device in pallet edge release position at the forward travel limit of the loader unit adjacent the leading edge of the plate and to set the gripper device in pallet edge gripping relation for exerting a pulling hold on the pallet as the plate skids thereunder and travel of the unit is away from the leading edge of the plate.

2. For use with a mobile truck, a load carrying skid plate, a push-pull device for relative to and fro travel on the plate, a rocker fulcrumed on the push-pull device, a pallet edge gripper jaw on one end of the rocker and a plate-engaging member on the opposite end of the rocker, said plate having a formation therein to cooperate with said member for rocking the gripper jaw to open position.

3. A material handling arrangement for a mobile truck, including a load supporting skid, a pallet edge grabber mounted for travel to and fro on said skid, and cooperating devices on the skid and grabber for actuating the grabber automatically during grabber travel as determined by its positions of travel.

4. In combination, a skid plate, pallet edge clamp jaws, means mounting the jaws for to and fro travel on the plate and means to control jaw operation including a follower connected to one of the jaws and arranged to track on the plate during to and fro travel of the jaws and a plate carried track for said follower shaped to cause the jaws to open at their forward limit of travel and to close beyond said forward limit.

5. In combination, a skid plate, means movable to and fro on the plate, a pair of cooperating clamp jaws carried by said means, a track follower operatively connected to said jaws to open and close the same, and a trackway for the follower formed to shift the follower during its movement with said means and thereby control jaw operation.

6. In a material handling truck having a lift skid for cooperation with a sheet pallet in the loading and unloading of the skid, the improvement which comprises a rack on the skid, a pusher-puller movably mounted for to and fro travel relative to the skid, a gear wheel rotatably mounted on the pusher-puller and engaged with the rack to walk the pusher-puller to and fro, power means controlling gear wheel rotation and means on the pusher-puller for detachable connection with a pallet.

7. In a lift truck having a forwardly projecting skid plate, a pusher-puller mounted on the plate for to and fro travel, a wheel rotatably carried by the pusher-puller for engagement with the plate to walk the pusher-puller thereon, power means to rotate said wheel in either direction, and pallet connecting means operable automatically to engage and disengage a pallet in response to pusher-puller positions on the plate.

8. In a lift truck having a forwardly projecting skid plate, a pusher-puller mounted on the plate for to and fro travel, a pair of spaced shafts rotatably journaled on the pusher-puller, motion transmitting means joining said shafts, a gear fixed on each shaft, a power operated rack engaging one of the gears, and a rack formation on said skid plate engaged by the other gear.

9. The structure of claim 8 wherein the rack formation on the skid plate comprises a longitudinal row of spaced depressions extending below the plate surface.

10. A truck skid plate for cooperation with a pusher-puller having a power driven toothed wheel for walking the same to and fro, tooth engaging formations on the plate comprising a row of spaced recesses in the plate and below the top surface thereof arranged to avoid obstruction to the positioning of a load on the flat plate surface.

11. In a sheet pallet handling truck, a skid plate, a power operated pusher-puller mounted on the plate for to and fro travel, a rocker lever fulcrumed on said pusher-puller, a pallet edge clamping jaw on one end of the rocker lever, a plate engaging follower on the opposite end of the rocker lever arranged to ride on the top surface of the plate throughout the major portion of pusher-puller travel and hold the jaw closed, and a follower-receiving depression in the plate near its leading edge enabling the jaw to open at the forward limit of pusher-puller travel.

12. For the handling of a load on a sheet pallet, a skid plate, a projectible-retractible assembly slidably mounted on the plate and including automatically operating pallet edge clamping device operable in response to member position on the skid plate so as to be open only at the forward limit of member projection and to be closed beyond said limit, a traction device carried by the member for cooperation with the plate in member projection and retraction, and a power motor drive connected with said traction device.

13. For loading and unloading a truck with a load-laden sheet pallet, a skid plate to be slid under the loaded sheet pallet, a power operated push-pull device mounted for to and fro travel relative to said plate, a pair of clamp jaws carried by said device to hold an edge of the sheet pallet, jaw operating mechanism normally retaining the jaws closed and means on the plate cooperating with said mechanism at the forward travel limit of said device for opening the jaws.

GUSTAF W. RYDNER.

REFERENCES CITED

The following references are of record in the file of this patent:

UNITED STATES PATENTS

| Number | Name | Date |
| --- | --- | --- |
| 2,256,454 | Bomar | Sept. 16, 1941 |
| 2,302,137 | Neuman | Nov. 17, 1942 |
| 2,421,128 | Pride | May 27, 1947 |